US012704195B2

(12) United States Patent
Massie et al.

(10) Patent No.: US 12,704,195 B2
(45) Date of Patent: Aug. 11, 2026

(54) ADAPTER PLATE FOR COUPLING A WATER TREATMENT CONTROLLER TO A VALVE BODY

(71) Applicant: Franklin Fueling Systems, LLC, Madison, WI (US)

(72) Inventors: Shawn B. Massie, Saint Paris, OH (US); Zachary K. Foster, Spencerville, IN (US); Bryan D. Drummond, Bluffton, IN (US)

(73) Assignee: Franklin Fueling Systems, LLC, Madison, WI (US)

( * ) Notice: Subject to any disclaimer, the term of this patent is extended or adjusted under 35 U.S.C. 154(b) by 44 days.

(21) Appl. No.: 18/977,197

(22) Filed: Dec. 11, 2024

(65) Prior Publication Data

US 2025/0109802 A1 Apr. 3, 2025

Related U.S. Application Data

(63) Continuation-in-part of application No. 18/374,909, filed on Sep. 29, 2023, now Pat. No. 12,455,015.

(51) Int. Cl.

| | |
|---|---|
| ***F16K 27/00*** | (2006.01) |
| ***C02F 1/00*** | (2023.01) |
| ***F16K 27/08*** | (2006.01) |
| ***F16K 27/12*** | (2006.01) |
| ***F16K 31/04*** | (2006.01) |
| *F16K 11/07* | (2006.01) |

(52) U.S. Cl.

CPC ............ *F16K 31/046* (2013.01); *C02F 1/008* (2013.01); *F16K 27/00* (2013.01); *F16K 27/08* (2013.01); *F16K 27/12* (2013.01); *C02F 2201/005* (2013.01); *F16K 11/0716* (2013.01); *Y10T 137/6007* (2015.04); *Y10T 137/7043* (2015.04); *Y10T 137/7062* (2015.04)

(58) Field of Classification Search

USPC ....... 210/138, 140–143, 662, 670, 190, 278; 251/315.1; 137/624.21, 625.65, 624.14

See application file for complete search history.

(56) References Cited

U.S. PATENT DOCUMENTS

| | | | | |
|---|---|---|---|---|
| 4,426,294 A | | 1/1984 | Seal | |
| 5,590,687 A | * | 1/1997 | Vaughan .................. | C02F 1/42 137/624.13 |

(Continued)

*Primary Examiner* — Matthew W Jellett

(74) *Attorney, Agent, or Firm* — Faegre Drinker Biddle & Reath LLP

(57) ABSTRACT

An adapter plate is provided for coupling a controller to a port of a valve, comprising: mounting tabs; an outer wall; retainer lugs and retention slots extending radially inward from the outer wall; and notches extending radially outward into the outer wall and spaced to align with snaps of the port. When the notches are aligned with the snaps, each retainer lug is positioned between a valve lug of the port and a snap, permitting the notches to pass over the snaps as the adapter plate is moved axially onto the port into an engaged position. The retention slots are configured to flex the snaps radially inward as the adapter plate is rotated from the engaged position to a seated position in which the snaps seat within the retention slots. The mounting tabs are configured to mate with connection snaps on the controller to couple the controller to the valve.

21 Claims, 14 Drawing Sheets

(56) References Cited

U.S. PATENT DOCUMENTS

| | | | | |
|---|---|---|---|---|
| 5,628,899 | A * | 5/1997 | Vaughan | C02F 1/42<br>137/625.46 |
| 6,402,944 | B1 * | 6/2002 | Vaughan | F16J 15/102<br>137/625.69 |
| 6,444,127 | B1 * | 9/2002 | Vaughan | F16K 31/046<br>137/554 |
| 8,500,999 | B2 | 8/2013 | Tischendorf et al. | |
| 8,529,768 | B2 | 9/2013 | Chandler, Jr. | |
| 8,945,384 | B2 | 2/2015 | Gruett et al. | |
| 8,961,797 | B2 * | 2/2015 | Vaughan | F16K 3/08<br>210/138 |
| 9,758,387 | B2 | 9/2017 | Gruett et al. | |
| 10,801,635 | B2 * | 10/2020 | Chang | F16K 27/0263 |
| 12,201,923 | B2 * | 1/2025 | Postel | B01D 27/06 |
| 12,318,711 | B2 * | 6/2025 | Thalmann | B01D 27/06 |
| 12,427,447 | B2 * | 9/2025 | Thalmann | B01D 27/06 |
| 12,455,015 | B2 | 10/2025 | Drummond et al. | |
| 2016/0201625 | A1 * | 7/2016 | Jokschas | B01D 27/08<br>210/232 |
| 2016/0296860 | A1 * | 10/2016 | Thalmann | B01D 35/005 |
| 2025/0110513 | A1 | 4/2025 | Drummond et al. | |

* cited by examiner 10
30
32
34
36
38
40
42
44
46
48
50
52
54
56
58
60
62
64
66
68
70
74
92
94
96
98
100
101
102
103
104
105
106
108
110
112
115
117
136
138
141
142
143
144
146
148
149
150
151
152
153
154
156
157
158
160

ADAPTER PLATE FOR COUPLING A WATER TREATMENT CONTROLLER TO A VALVE BODY

CROSS-REFERENCE TO RELATED APPLICATIONS

This application is a continuation-in-part of U.S. patent application Ser. No. 18/374,909, filed on Sep. 29, 2023, entitled "WATER TREATMENT CONTROLLER HOUSING WITH BACKPLATE MOUNT," the entire contents of which being expressly incorporated herein by reference.

FIELD

The present disclosure pertains to control valves for water treatment systems and more particularly to a control valve with a controller that is quickly, easily and safely removed from and attached to the valve body of the control valve.

BACKGROUND

Control valves for water softeners and iron filters include several moving parts which may require periodic maintenance. In many applications, a control piston moves to different positions within a seal stack positioned inside the control valve to define different fluid flow passageways that permit the various operational modes of the valve body (e.g., service, regeneration, backwash, etc.). Over time, this movement causes wear of the seal stack necessitating its replacement.

Conventionally, the movement of the piston and various other functions of the control valve are controlled by a controller mounted to the valve body. In many systems, the controller must be removed to access the piston and the seal stack. The removal of the controller may be a complicated, time-consuming operation, which may result in damage to various components of the controller (e.g., the electronics housed inside) and/or the valve body. The time required to disassemble the controller from and reassemble the controller to the valve body to replace the seal stack translates into increased operation costs because typically a maintenance person is paid to perform the operation.

Accordingly, it is desirable to enable quick, easy and safe removable coupling of a controller to a plurality of different valve bodies.

SUMMARY

According to one embodiment, the present disclosure provides an adapter plate for coupling a water treatment system controller to a valve body having a retention stop with a cylindrical wall and valve lugs and snaps extending radially outward from the cylindrical wall, the adapter plate comprising: a plurality of mounting tabs; an outer wall defining a central opening; a plurality of retainer lugs extending radially inward from the outer wall; a plurality of retention slots extending radially inward from the outer wall; and a plurality of clearance notches extending radially outward into the outer wall and spaced to align with the snaps of the retention stop; wherein when the plurality of clearance notches is aligned with the snaps, each of the plurality of retainer lugs is positioned between a valve lug and a snap permitting the plurality of clearance notches to pass over the snaps and the plurality of retainer lugs to pass between the valve lugs and the snaps as the adapter plate is moved axially onto the cylindrical wall of the retention stop into an engaged position; wherein the plurality of retention slots is configured to flex the snaps radially inward as the adapter plate is rotated in a first direction from the engaged position to a seated position in which the snaps seat within the plurality of retention slots; and wherein the plurality of mounting tabs is configured to mate with connection snaps on the controller to couple the controller to the valve body. In one aspect of this embodiment, each of the plurality of mounting tabs extends rearwardly from a body of the adapter plate and includes a side wall with a rear edge and a ridge extending from the body to the rear edge. In a variant of this aspect, each of the connection snaps of the controller includes an alignment guide element that receives a ridge of one of the plurality of mounting tabs and a catch surface that engages a rear edge of the one mounting tab to secure the controller to the adapter plate. In another variant, the plurality of mounting tabs is configured to cause the connection snaps to flex away from one another until the catch surfaces of the connection snaps engage the rear edges of the plurality of mounting tabs. In another aspect of this embodiment, when the adapter plate is in the seated position, a pair of the plurality of retainer lugs is positioned behind a pair of valve lugs, thereby preventing axial movement of the adapter plate away from a circumferential ridge of the cylindrical wall of the retention stop. In another aspect, each of the plurality of retention slots includes one of the plurality of retainer lugs and a retainer that extends along the outer wall. In a variant of this aspect, each retainer includes a compression wall that engages a snap to cause the snap to flex radially inward as the adapter plate is rotated from the engaged position to the seated position. In a further variant, each retainer includes a retention wall having a bevel to receive a snap when the snap unflexes as the adapter plate reaches the seated position and an outward step to retain the snap and inhibit rotation of the adapter plate in a second direction that is opposite the first direction. In a further variant, each retainer includes a stop that extends radially inward from the outer wall and limits rotation of the adapter plate in the first direction by engaging a snap as the adapter plate reaches the seated position. In another aspect, each of the plurality of clearance notches includes an angled surface and a return surface that are together configured to receive a tang of a snap when the plurality of clearance notches is aligned with the snaps. In another aspect, the outer wall includes a plurality of rotation notches configured to receive a tool used to rotate a drive gear installed in the valve body.

In another embodiment, the present disclosure provides a system for mounting a water treatment system controller to a valve body having a retention stop with a cylindrical wall and valve lugs and snaps extending radially outward from the cylindrical wall, the system comprising: an adapter plate having mounting tabs, clearance notches, retainer lugs and retention slots positioned around a central opening of the adapter plate such that when the clearance notches are aligned with the snaps, the retainer lugs and the retention slots are positioned between the valve lugs and the snaps such that the adapter plate may be moved axially onto the cylindrical wall into an engaged position and rotated in a first direction from the engaged position to a seated position wherein the retainer lugs are positioned behind the valve lugs and the snaps are seated within the retention slots; and a controller housing including connection snaps that engage the mounting tabs to secure the controller to the adapter plate. In one aspect of this embodiment, each of the mounting tabs extends rearwardly from a body of the adapter plate and includes a side wall with a rear edge and a ridge extending from the body to the rear edge. In a variant of this aspect, each of the connection snaps includes an alignment guide element that receives a ridge of one of the mounting tabs and a catch surface that engages a rear edge of the one mounting tab to secure the controller to the adapter plate. In a further variant, the mounting tabs are configured to cause the connection snaps to flex away from one another until the catch surfaces of the connection snaps engage the rear edges of the mounting tabs. In another aspect, when the adapter plate is in the seated position, a pair of the retainer lugs is positioned behind a pair of valve lugs, thereby preventing axial movement of the adapter plate away from a circumferential ridge of the cylindrical wall of the retention stop. In another aspect, each of the retention slots includes one of the retainer lugs and a retainer, each retainer including a compression wall that engages a snap to cause the snap to flex radially inward as the adapter plate is rotated from the engaged position to the seated position. In a variant of this aspect, each retainer includes a retention wall having a bevel to receive a snap when the snap unflexes as the adapter reaches the seated position and an outward step to retain the snap and inhibit rotation of the adapter plate in a second direction that is opposite the first direction. In another variant, each retainer includes a stop that extends radially into the central opening and limits rotation of the adapter plate in the first direction by engaging a snap as the adapter plate reaches the seated position. In another aspect, each of the clearance notches includes an angled surface and a return surface that are together configured to receive a tang of a snap when the clearance notches are aligned with the snaps.

In yet another embodiment, the present disclosure provides a method of mounting a water treatment system controller to a valve body having a retention stop with valve lugs and snaps extending radially outward from a cylindrical wall, comprising: aligning clearance notches of an adapter plate with the snaps; moving the adapter plate axially onto the cylindrical wall into an engaged position; rotating the adapter plate in a first direction from the engaged position to a seated position wherein retainer lugs of the adapter plate are positioned behind the valve lugs and retention slots of the adapter plate receive the snaps; aligning guide elements of connection snaps of the controller with ridges on mounting tabs of the adapter plate; and moving the controller axially toward the adapter plate until the connection snaps extend over the mounting tabs, thereby securing the controller to the adapter plate.

BRIEF DESCRIPTION OF THE DRAWINGS

The above-mentioned and other advantages and objects of this disclosure, and the manner of attaining them, will become more apparent, and the disclosure itself will be better understood, by reference to the following description of embodiments of the invention taken in conjunction with the accompanying drawings, wherein.

Figure 1:
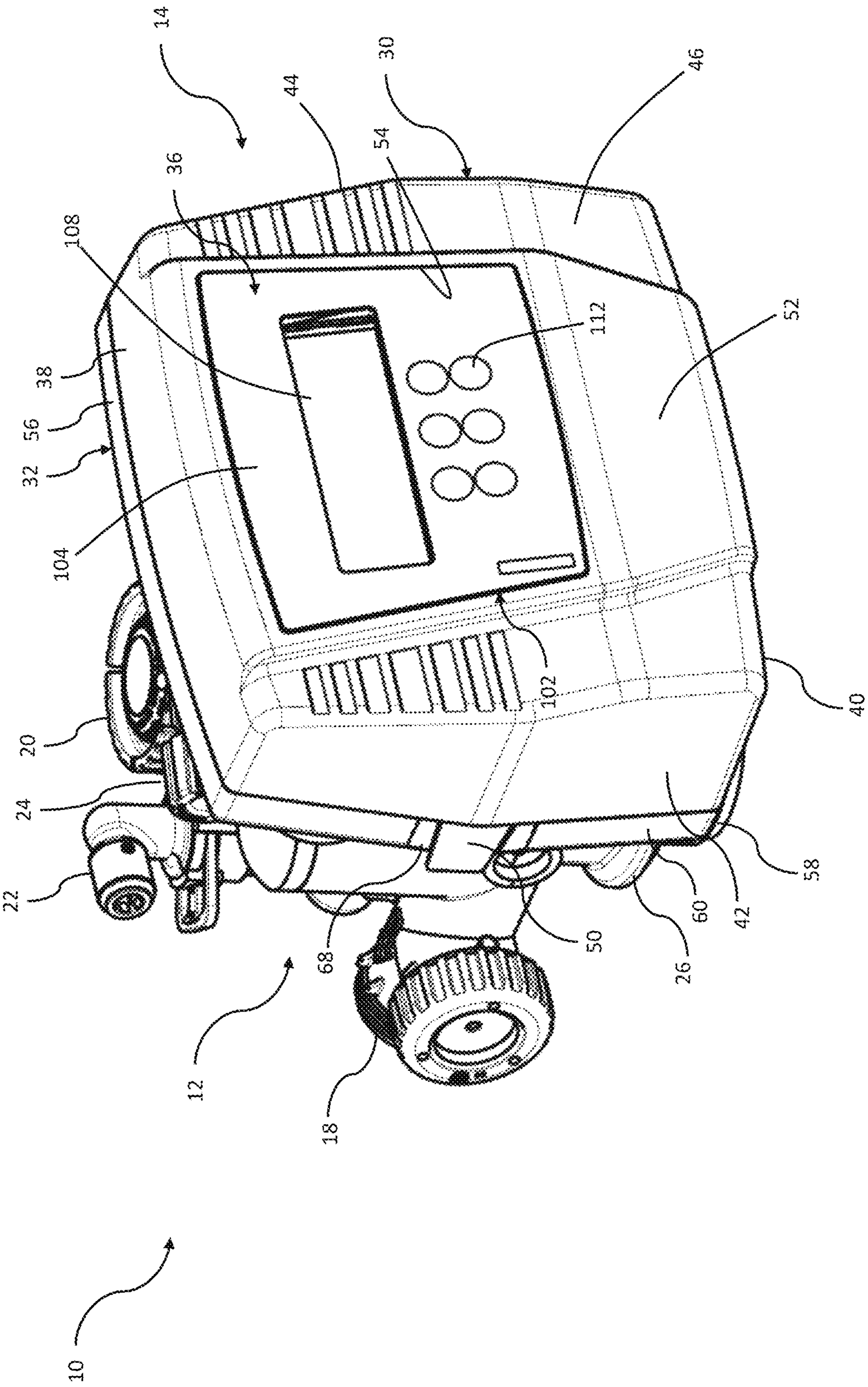
FIG. 1 is a front, perspective view of a control head according to one embodiment of the present disclosure.
Figure 2:
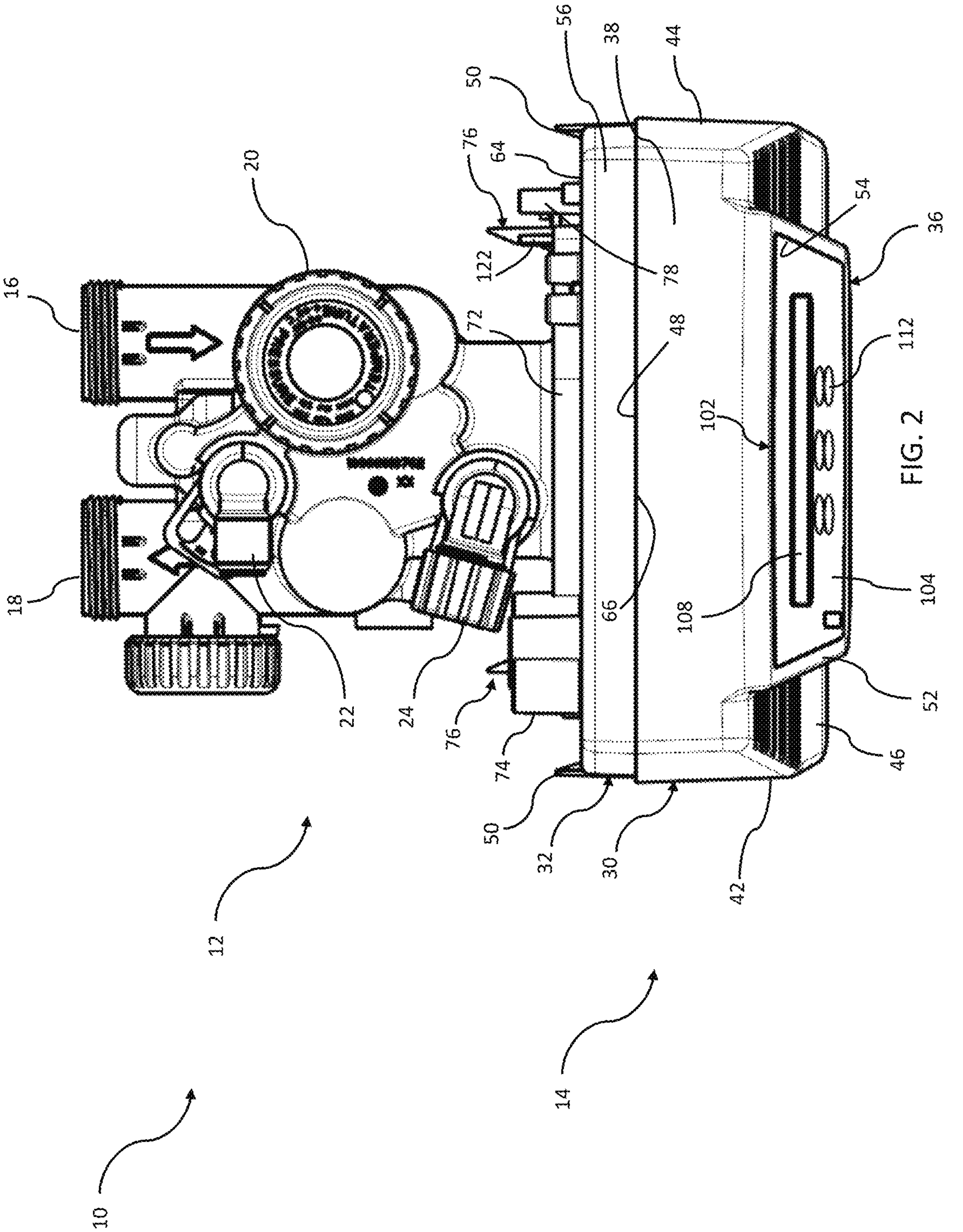
FIG. 2 is a top view of the control valve of FIG. 1.
Figure 3:
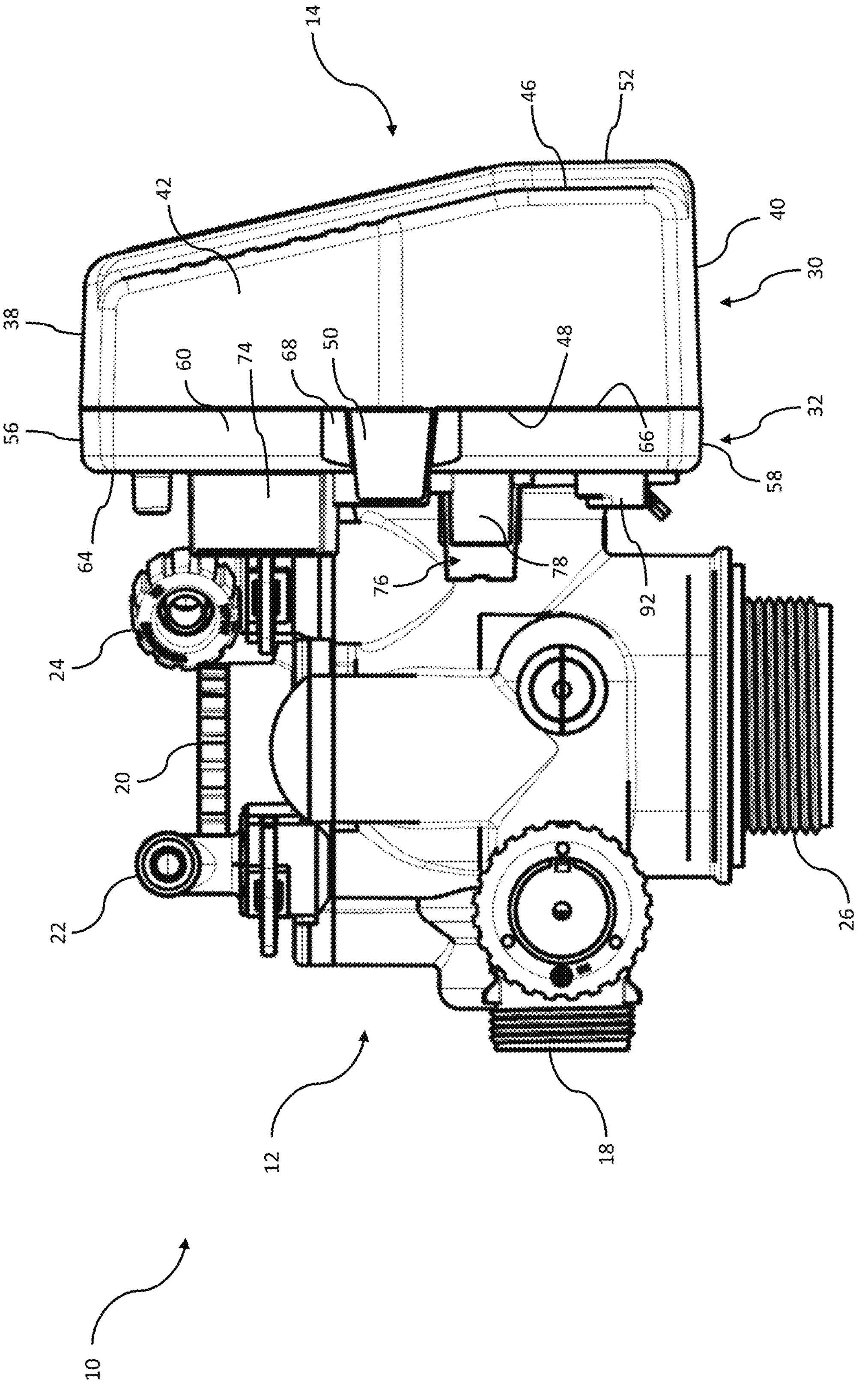
FIG. 3 is a side view of the control valve of FIG. 1.

Corresponding reference characters indicate corresponding parts throughout the several views. Although the drawings represent embodiments of the present disclosure, the drawings are not necessarily to scale, and certain features may be exaggerated or omitted in some of the drawings in order to better illustrate and explain the present disclosure.

DETAILED DESCRIPTION

As is discussed in much greater detail below, the present disclosure provides a controller that can be quickly, easily and safely removed from and attached to a valve body to facilitate replacement of the controller and/or replacement of the seal stack. In one embodiment, the controller is provided with a pair of retention elements and a mounting flange of the valve body is provided with a corresponding pair of retention elements. FIG. 5B shows such an embodiment. The retention elements on the controller 14 are in the form of connection snaps 76 and the retention elements on the mounting flange 28 are in the form of mounting tabs 122. The connection snaps 76 extend from the rear of the controller 14 and each include a cam 82, a catch surface 83 and a groove 84 that extends the length of the connection snap 76. The mounting tabs 122 extend rearwardly from the mounting flange 28 and each include a ridge 128 and a rear edge 126. The controller 14 is attached to the mounting flange 28 by aligning the grooves 84 of the connection snaps 76 with the ridges 128 of the mounting tabs 122 and moving the controller 14 laterally toward the mounting flange 28. The cams 82 of the connection snaps 76 engage the mounting flange 28, causing the connection snaps 76 to flex outwardly (i.e., away from one another) from an unflexed state to a flexed state as the snaps 76 move farther over the mounting tabs 122. When the catch surfaces 83 of the connection snaps 76 reach the rear edges 126 of the mounting tabs 122, the connection snaps 76 snap back to their original unflexed state. Engagement between the catch surfaces 83 of the connection snaps 76 and the rear edges 126 of the mounting tabs 122 retains the controller 14 in place. The controller 14 is detached from the mounting flange 28 by flexing the connection snaps 76 away from each other and moving the controller 14 laterally away from the mounting flange 28. Further detail of this structure and its use is provided below.

Referring now to FIGS. 1-4, a control valve 10 according to one embodiment of the present disclosure is shown. In the remainder of this description the control valve 10 is described as used in a water softener application. It should be understood, however, that the control valve 10 may also be used in well water iron treatment systems and other fluid treatment applications. The control valve 10 generally includes a valve body 12 and a controller 14. The valve body 12 includes a fluid inlet 16, a fluid outlet 18, an injector assembly 20, a brine port 22, a drain 24, a tank connection 26 and a mounting flange 28. The valve body 12 is typically mounted to the top of a resin tank (not shown) containing resin bed for water treatment. Untreated water is delivered to the valve body 12 through the fluid inlet 16 and passed through the valve body 12 to the tank through the tank connection 26. After flowing through the resin bed in the tank, the treated fluid is passed back through the valve body 12 and through the fluid outlet 18 for delivery to various faucets, taps, shower heads, and/or appliances throughout the home or other facility. The injector assembly 20 facilitates regeneration of the resin in the tank by drawing a brine solution from a brine tank (not shown) connected to the brine port 22 and delivering it to the tank where its sodium or potassium ions are exchanged for the hardness mineral ions in the resin. The mineral rich brine solution then flows back up to the valve body 12 and is discharged through the drain 24, which is normally connected through plumbing to a drain in the floor of the home or other facility. It should be understood that the valve body 12 includes a variety of other components that are not described to simplify this description. The mounting flange 28 is configured to connect to the controller 14 as is further described below.

Still referring to FIGS. 1-4, the controller 14 generally includes a front housing 30 and a rear housing 32. In certain embodiments, the front housing 30 and the rear housing 32 are formed by injection molding a plastic material. In other embodiments, the housings 30, 32 may be formed using a different process and different materials. The front housing 30 includes a circuit board assembly 34 and a membrane switch assembly 36 in addition to a plurality of other components as is further described below. The front housing 30 includes a top wall 38, a bottom wall 40, a first side wall 42, a second side wall 44, a front wall 46 and a rear edge 48 formed by the top wall 38, the bottom wall 40, and the side walls 42, 44. Internal components of the front housing 30 are described below. The top wall 38, the bottom wall 40, the side walls 42, 44 and the front wall 46 generally form a partial enclosure that houses the internal components. The side walls 42, 44 each include a retaining tab 50 for connecting the front housing 30 to the rear housing 32 as is further described below. The front wall 46 includes a central portion 52, which in this embodiment protrudes somewhat from the remaining parts of the front wall 46. The central portion 52 includes a switch recess 54 for receiving the membrane switch assembly 36 as is also further described below.

Figure 4:
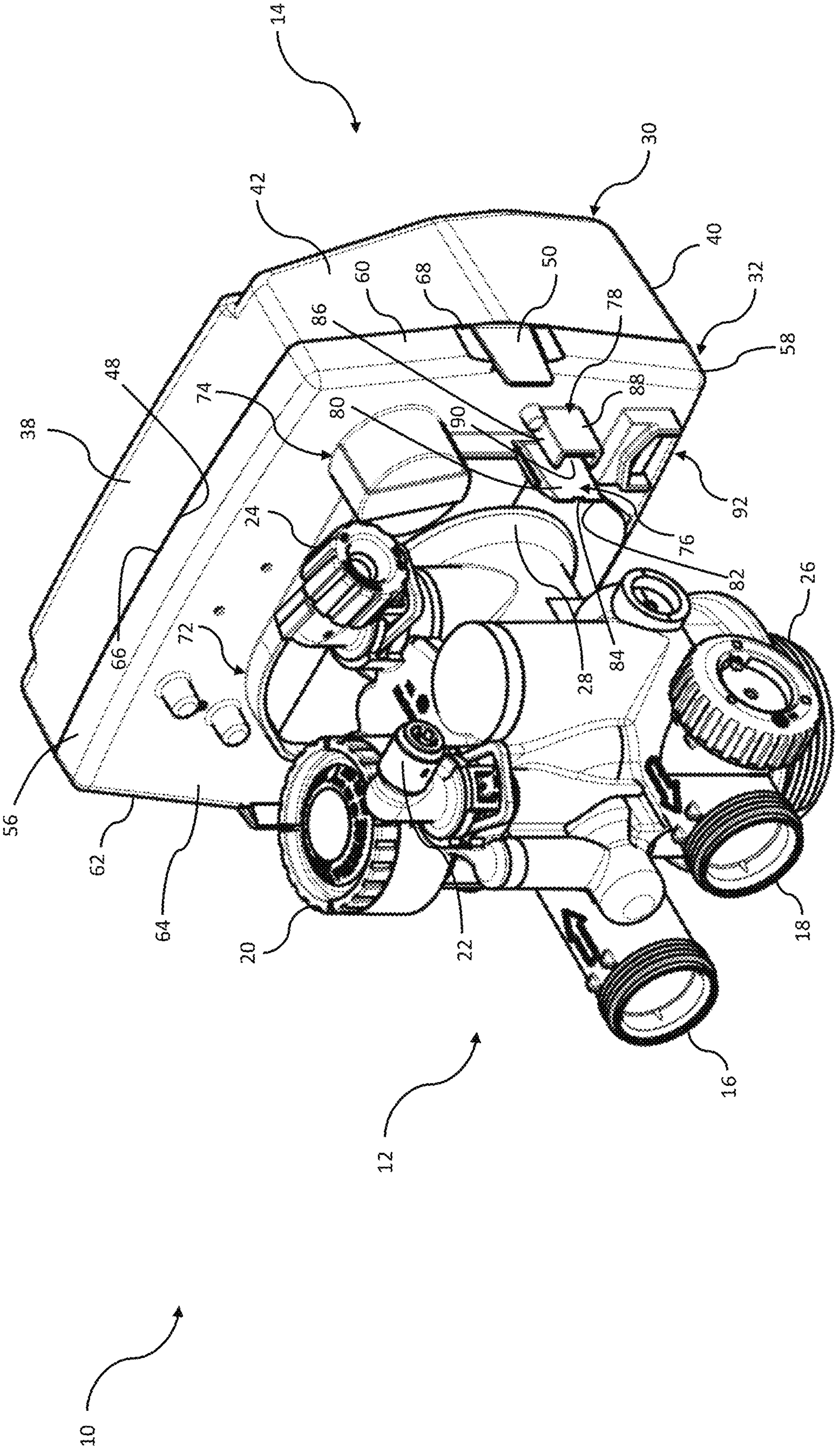
FIG. 4 is a rear, perspective view of the control valve of FIG. 1.

As is best shown in FIG. 4, the rear housing 32 generally includes a top wall 56, a bottom wall 58, a first side wall 60, a second side wall 62, a rear wall 64 and a front edge 66. Each of the side walls 60, 62 includes a retaining recess 68 which mates with the retaining tabs 50 of the front housing's side walls 42, 44 as is further described herein. When the front housing 30 is connected to the rear housing 32 in the manner described herein, the rear edge 48 of the front housing 30 mates with or engages the front edge 66 of the rear housing 32 to form a substantially enclosed volume.

The rear wall 64 of the rear housing 32 include a central opening 70 (FIG. 5A), a mating wall 72, a gear box housing 74, connection snaps 76, and over-extension walls 78. The central opening 70 facilitates engagement between a control gear 140 and a drive gear 172 as is further described below. The mating wall 72 is positioned adjacent an upper edge 120 of a front wall 118 of the mounting flange 28 of the valve body 12 as is further described below. The gear box housing 74 receives a gear box 136 that rotates the gears 140, 172 to produce movement of a piston 170 that configures the valve body 12 for the various cycles included in operation of the water softener as is also further described below.

The connection snaps 76 generally include a body 80 which protrudes substantially perpendicularly from the rear wall 64, a cam 82 (FIG. 5A) formed on the inward surface of the body 80, a catch surface 83 at the inner intersection between the body 80 and the cam 82, and a groove 84 that extends through the cam 82, the catch surface 83 and the inner surface of the body 80. The groove 84 mates with a ridge 128 formed in mounting tabs 122 of the mounting flange 28 as is further described below. While the connection snaps 76 are described herein as including grooves 84 and the mounting tabs 122 are described as including ridges 128, it should be understood that in alternative embodiments the connection snaps 76 could include ridges and the mounting tabs 122 could include grooves. Additionally, other cooperating surfaces are contemplated by the present disclosure, and more than one such set of cooperating surfaces could be used. Collectively, the cooperating surfaces (including the grooves 84 and the ridges 128) may be referred to as alignment guide elements. Moreover, it is contemplated that the connection snaps 76 and mounting tabs 122 may be replaced with other complementary mating structures in alternative embodiments. In other words, rather than using snaps on the controller 14 that flex and catch onto mounting tabs 122 on the valve body 12, those components could not only be reversed, but could be replaced by other mating structures such as clasp latches, a detent and recess combination, magnets, etc. These various types of connection structures are collectively referred to herein as retention elements.

As best shown in FIG. 4, the over-extension walls 78 each include a pair of side walls 86, an outer wall 88 extending between the side walls 86, and a recess 90 formed by the side walls 86 and the outer wall 88. The over-extension walls 78 extend substantially perpendicularly from the rear wall 64 and are positioned adjacent the connection snaps 76 to provide a stop that prevents over extension of the snaps 76 when they are flexed to engage and disengage the mounting tabs 122 of the mounting flange 28 as is further described below. The rear wall 64 further includes wiring openings 92 which receive wires for electrical connections to power and other devices as is further described below. In one embodiment, the wiring openings 92 are filled with foam, which permits the wires to be routed through the openings 92 but impedes ingress of water or other fluids.

Figure 6:
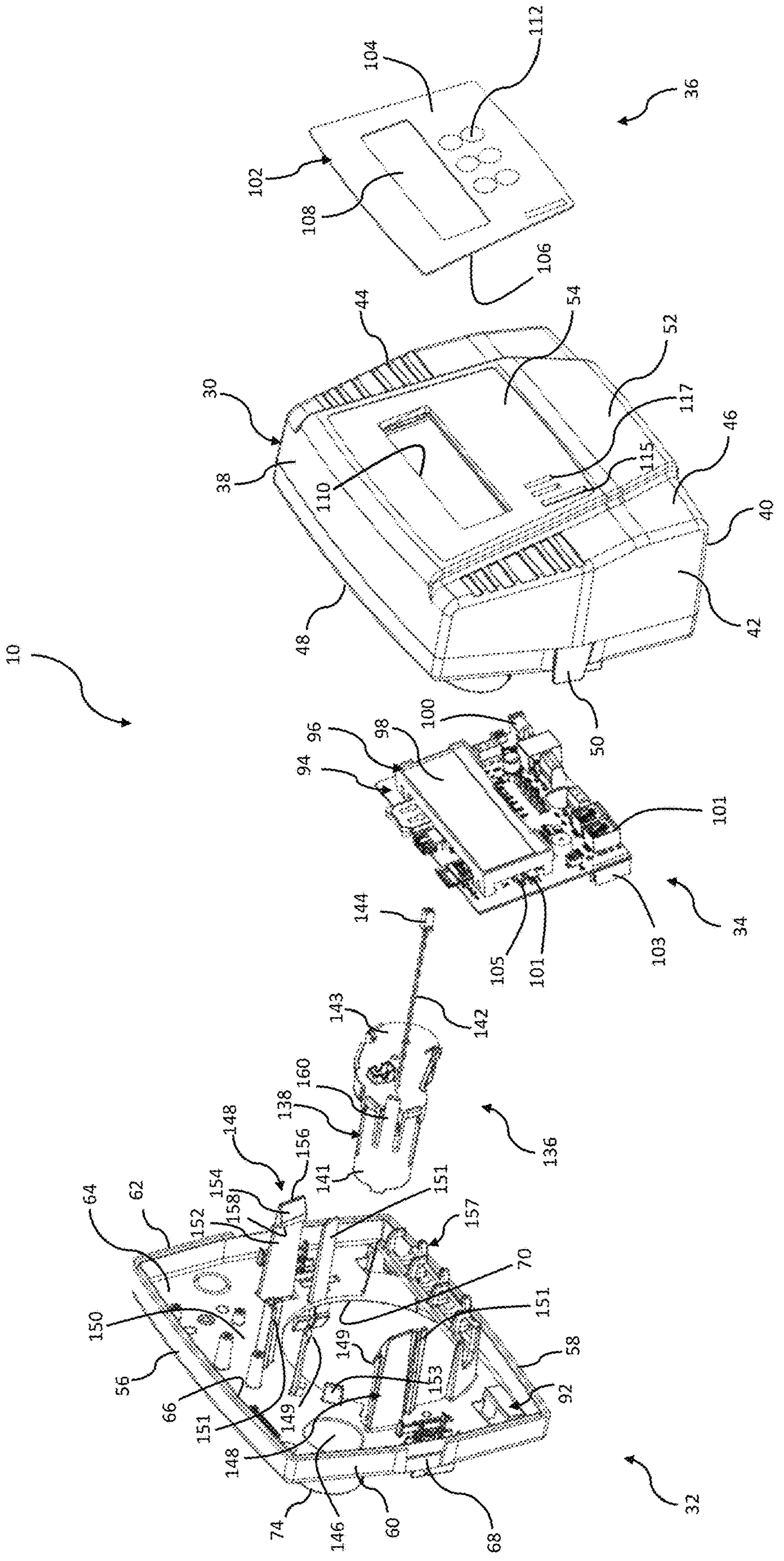
FIG. 6 is a perspective, exploded view of components of the controller according to one embodiment of the present disclosure.

Referring now to FIG. 6, the circuit board assembly 34 generally includes a printed circuit board ("PCB") 94 on which is mounted a plurality of connectors generally designated and a display assembly 96 including a display 98. The plurality of connectors includes a power connector 100, a flow meter connector 101, a ribbon cable connector 103, and a gear box connector 105. The power connector 100 is configured to receive a mating connector from a power source. The flow meter connector 101 is configured to receive a mating connector of a cable connected to the flow meter (not shown). The ribbon cable connector 103 is configured to receive a connector on a ribbon cable (not shown) that extends from the membrane switch assembly 36 as is further described below. The gear box connector 105 is configured to receive the connector 144 of the motor cable 142 from the gear box 136. A plurality of additional electrical components are mounted to the PCB 94 to enable the functions described herein, but are not described to simplify this description.

Referring to FIGS. 1 and 6, the membrane switch assembly 36 includes a body 102 with a front surface 104 and a rear surface 106. In certain embodiments, the rear surface 106 includes an adhesive (not shown) for securing the membrane switch assembly 36 to the switch recess 54 of the front wall 46 of the front housing 30. The body 102 further includes a transparent portion 108 which is positioned to align with an opening 110 in the switch recess 54, which is also aligned with the display 98 of the circuit board assembly 34. The body 102 also includes internal switches (not shown) which are aligned with buttons 112 formed on the body 102 such that when a user presses a button 112 a corresponding internal switch is activated. Internal conductors route electrical signals from the internal switches to a ribbon cable (not shown). The ribbon cable (not shown) extends from the body 102 and is passed through a ribbon cable opening 115 through the switch recess 54 to connect to the circuit board assembly 34. The openings 117 through the switch recess 54 are used to mold a catch (not shown) on the inside of the switch recess 54. The catch receives a tether (not shown) which is also connected to the rear housing 32 to prevent damage to the ribbon cable (over extension) when the front housing 30 is removed. The tether also allows the front housing 30 to hang from the rear housing 32 during servicing and/or troubleshooting the controller 14.

Figure 5A:
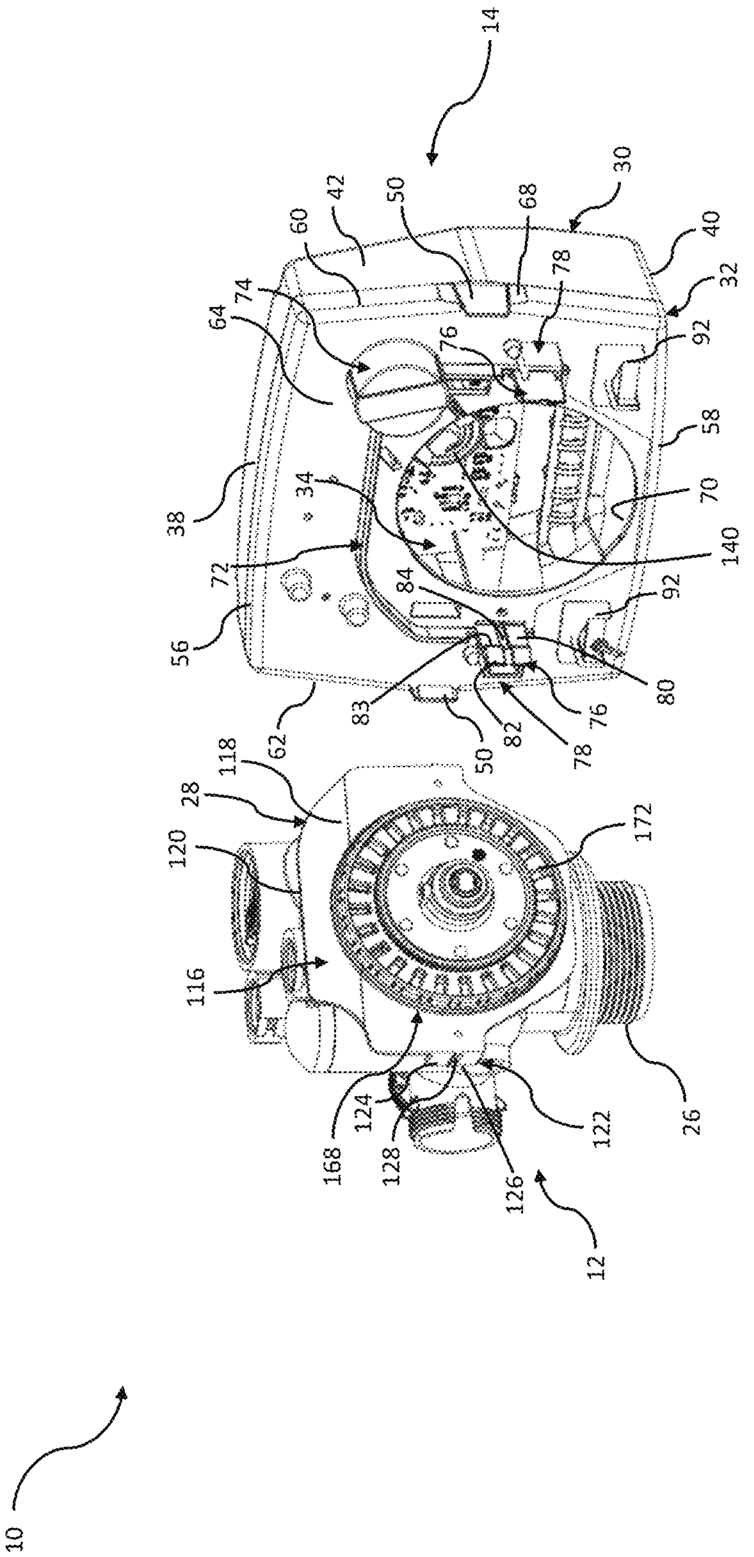
FIG. 5A is a perspective view of the control valve of FIG. 1 with the controller detached from the valve body.
Figure 5B:
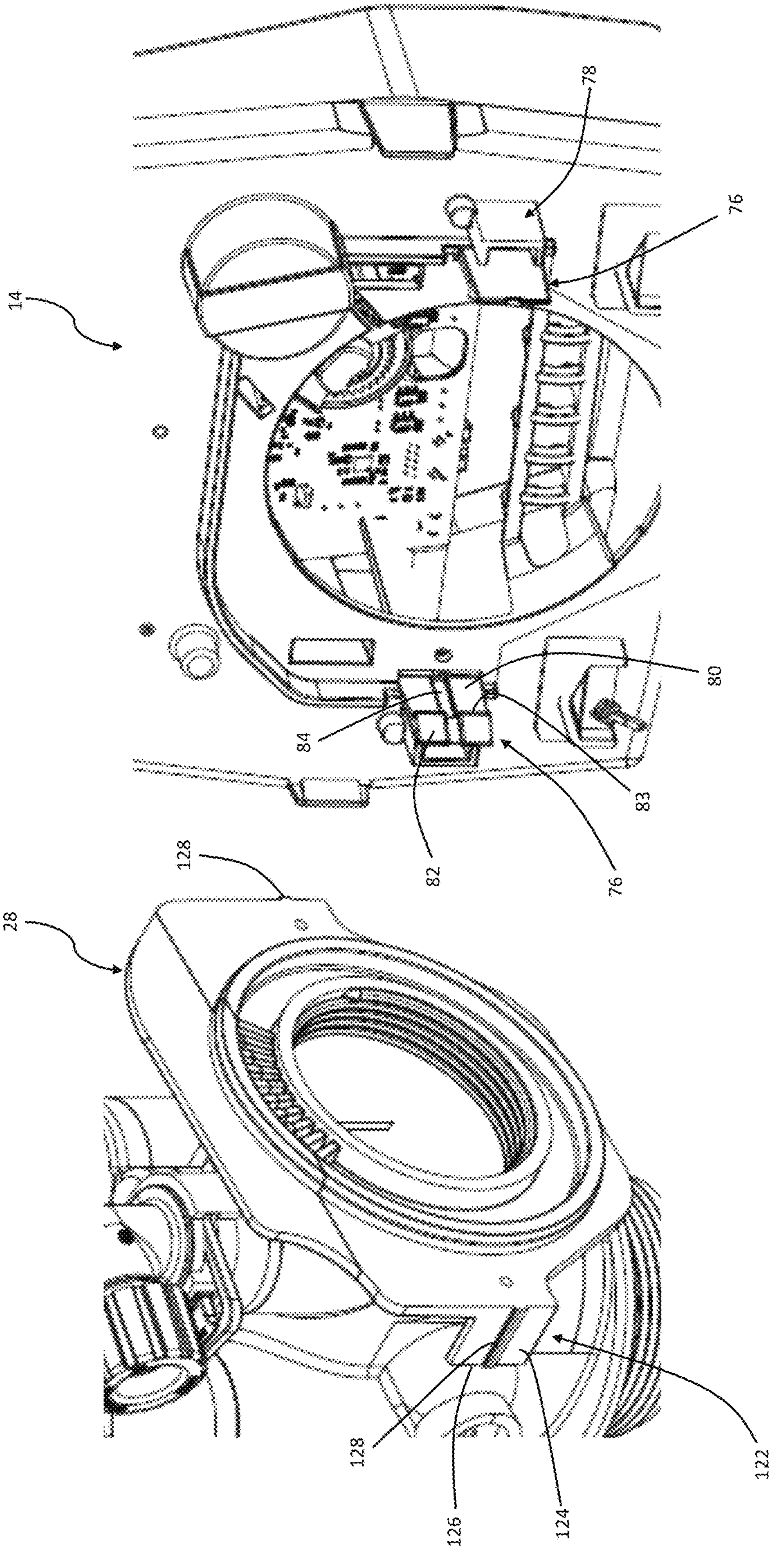
FIG. 5B is an enlarged perspective view of the control valve of FIG. 1 with the controller detached from the valve body.
Figure 7:
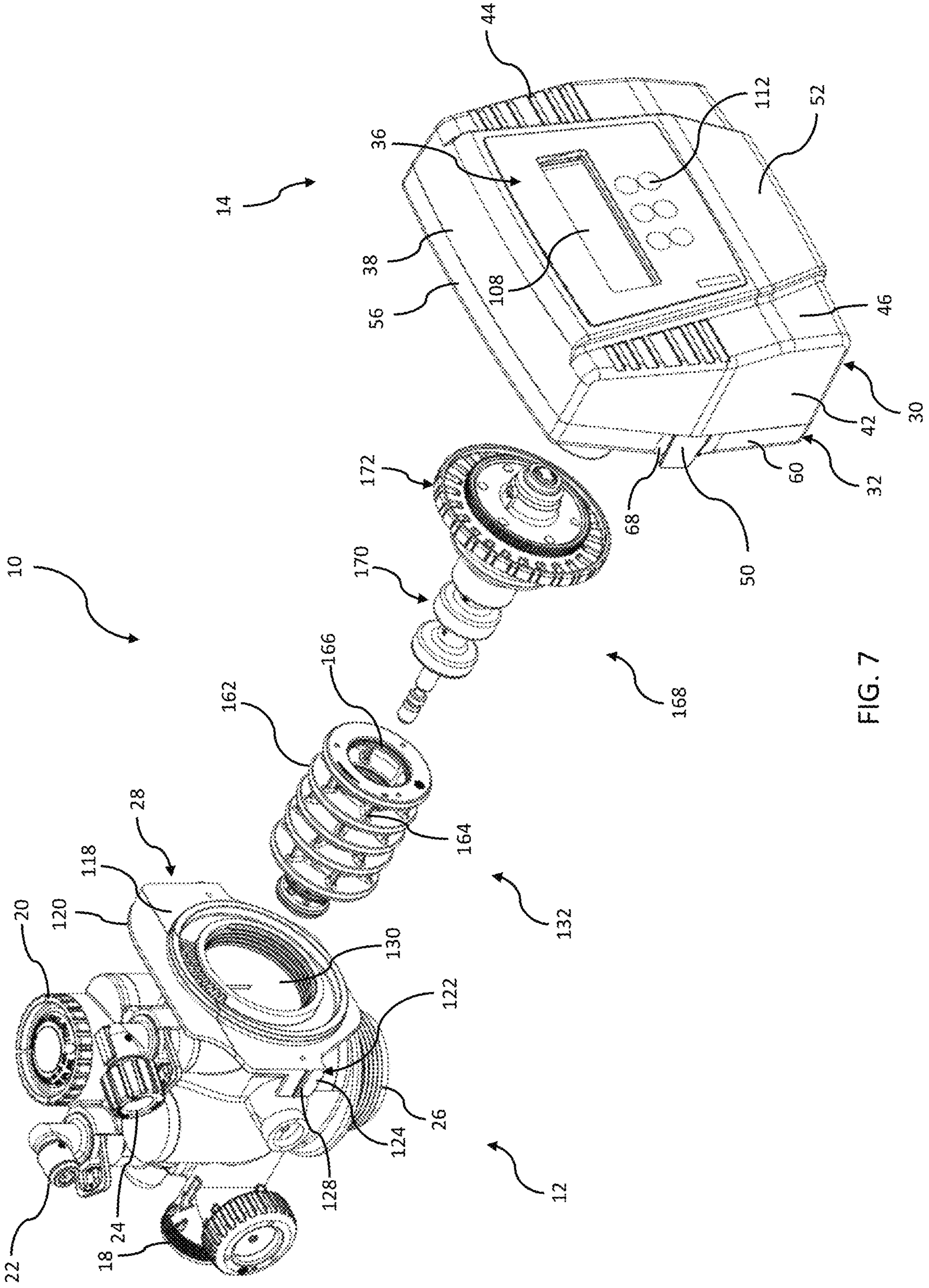
FIG. 7 is a front, perspective, exploded view of component of the valve body and controller according to one embodiment of the present disclosure.

Referring now to FIG. 5A, the valve body 12 is depicted substantially assembled with the controller 14 detached. The mounting flange 28 of the valve body 12 is, in one embodiment, integrally formed as part of the valve body 12. In another embodiment, the mounting flange 28 is configured to be attached to one or more different types of control valves 12 as a retrofit component. The mounting flange 28 includes a body 116 having a front wall 118. An upper edge 120 of the front wall 118 is configured to mate with the mating wall 72 of the rear housing 32 of the controller 14. A pair of mounting tabs 122 extend rearwardly in substantially perpendicular relation to the front wall 118. The mounting tabs 122 include a side wall 124 and a rear edge 126. A ridge 128 is formed in the side wall 124 and extends from the front wall 118 of the mounting flange 28 to the rear edge 126 of the side wall 124. The ridges 128 are positioned to be received in the grooves 84 on the inner surface of the body 80 of the connection snaps 76 when the controller 14 is mounted to the mounting flange 28. As best shown in FIG. 7, the mounting flange 28 also includes a central opening 130 which is configured to receive the seal stack 132 and the gear piston assembly 168 as is further described below.

Referring again to FIG. 6, the gear box 136 is shown removed from the gear box housing 74 of the rear housing 32 of the controller 14. The gear box 136 generally includes a cylindrical housing 138 that houses a motor (not shown) which rotates the control gear 140 (FIG. 8) disposed in the controller 14. The gear box 136 also includes a motor cable 142 with a connector 144 on one end that connects to the gear box connector 105 on the PCB 94 to receive power and control signals from the controller 14. The cylindrical housing 138 is sized to be received within an opening 146 of the gear box housing 74. The cylindrical housing 138 also includes a plurality of retention prongs 160 which retain the lower portion 141 of the housing 138 to the upper portion 143 of the housing 138.

FIG. 6 also shows a pair of support arms 148 extending outwardly from the inner surface 150 of the rear housing 32 and a plurality of standoffs 151. The support arms 148 include an elongated body 152 and a cam 154 at the outer end 156 of the elongated body 152 that forms a catch 158. Note that FIG. 6 shows the rear housing 32 both attached to the front housing 30 and detached (left hand side) from the rear housing 32. Together the support arms 148 and the standoffs 151 provide a mounting structure for the circuit board assembly 34. More specifically, the PCB 94 is moved laterally toward the rear wall 64 of the rear housing 32 to engage the cams 154 of the support arms 148 and flex the support arms 148 away from one another. When the PCB 94 is moved far enough, the PCB 94 will rest on the standoffs 151 and the support arms 148 will return to their unflexed state such that the catches 158 of the support arms 148 retain the PCB 94 in place. FIG. 6 also shows a pair of retention prongs 149 and an anti-rotation tab 153 which hold the gearbox 136 in place in the opening 146 of the gear box housing 74. The gear box housing 74 support the gear box 136 against lateral and reward motion, the anti-rotation tab 153 supports the gearbox 136 against lateral and rearward motion as well as rotation. The retention prongs 149 retain the gear box 136 in rear housing 32. Finally, FIG. 6 also shows a wire routing feature 157 which is used to route and retain the power cord and flow meter cable within the controller 14.

Figure 8:
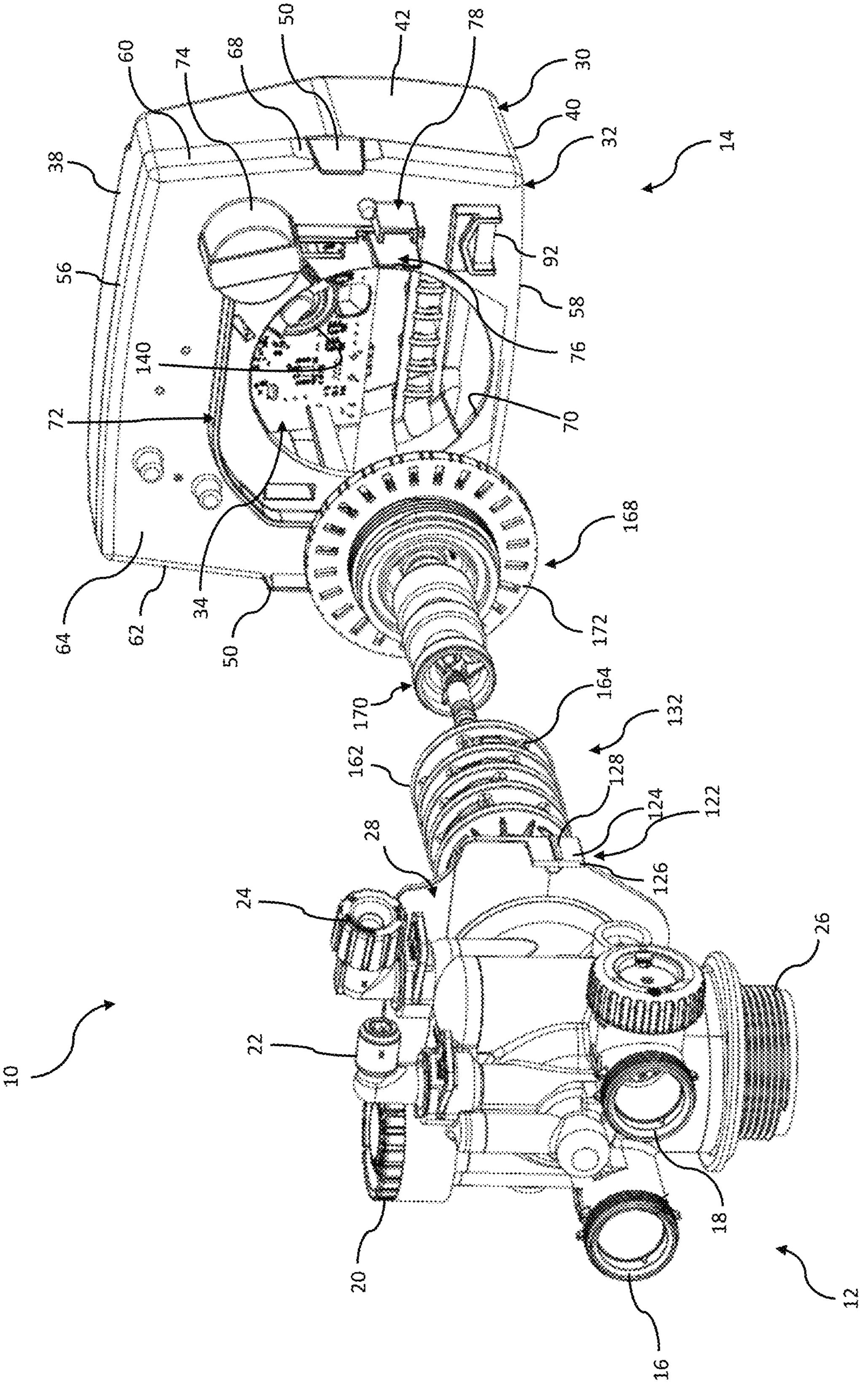
FIG. 8 is a rear, perspective, exploded view of component of the valve body and controller according to one embodiment of the present disclosure.

As shown in FIGS. 5, 7 and 8, the seal stack 132 of the valve body 12 includes a plurality of disks 162 connected to one another by a plurality of circumferentially spaced apart wall portions 164. A central bore 166 extends through the disks 162 and is configured to receive the piston 170 of the gear piston assembly 168. The disks 162 are sized to be received through the central opening 130 of the mounting flange 28 into a central bore (not shown) in the valve body 12. The gear piston assembly 168 includes a drive gear 172 coupled to the piston 170. When the controller 14 is attached to the mounting flange 28 of the valve body 12, the drive gear 172 is engaged by the control gear 140 (FIG. 8) which is driven by the gear box 136 under the control of the electronics on the PCB 94. As is known in the art, rotation of the drive gear 172 causes longitudinal movement of the piston 170 in the central bore 166 of the seal stack 132. Depending upon the position of the piston 170 in the seal stack 132, various flow passageways are opened and/or closed to the fluid inlet 16, the fluid outlet 18, the injector assembly 20, the brine port 22, the drain 24 and the tank connection 26 to permit the water softener to operate in one of the various operation modes (e.g., service, backwash, rinse, and regeneration).

Referring again to FIG. 6, the controller 14 is assembled by passing the ribbon cable (not shown) of the membrane switch assembly 36 through the ribbon opening 115 in the switch recess 54 of the front wall 46 of the front housing 30. The body 102 of the membrane switch assembly 36 may then be affixed to the switch recess 54, aligning the transparent portion 108 with the opening 110 of the switch recess 54. A connector on the ribbon cable (not shown) is connected to the ribbon cable connector 103 on the PCB 94. The connector 144 of the gear box 136 is connected to the gear box corresponding connector 105 on the PCB 94 and the gear box 136 is installed in the gear box housing 74 of the rear housing 32. At this point, the front housing 30 may be connected to the rear housing 32 by snapping the retaining tabs 50 of the front housing 30 over the retaining recesses 68 of the rear housing 32, thereby bringing together the rear edge 48 of the front housing 30 and the front edge 66 of the rear housing 32 to form a substantially water-tight seal.

As indicated above, a feature of the present disclosure is the ease, safety and speed with which the seal stack 132 may be replaced during routine maintenance. As indicated, the movement of the piston 170 within the central bore 166 of the seal stack 132 along with contaminants in the water causes wear over time, requiring replacement of the seal stack 132. In certain conventional control head designs, seal stack replacement is a time-consuming process that may result in damage to components of the controller. Normally, the seal stack is replaced by removing a face plate of the controller to expose the PCB. The power connector and the flow meter connector are disconnected from the PCB. The PCB assembly is then removed by unclipping its supporting bracket from retention tabs extending from the body of the control valve. This leaves the PCB assembly exposed to the environment during seal stack replacement, which in some instances can result in damage to the controller components or to the PCB. After the PCB assembly is disconnected from the retention tabs, the gear piston assembly must be unscrewed from control valve, typically using a special tool. Once unscrewed, the gear piston assembly and seal stack may be removed. A new seal stack is then installed into the control valve and the process is reversed. One potential problem that may occur during reassembly is miswiring or damage to connectors as many of the connections are physically interchangeable. In the event that the controller is in need of replacement, the above steps are followed with the addition of disengagement of the retention tabs between the body of the control valve and the controller body. In some instances, the retention tabs are broken, which requires the replacement of the entire control valve.

Replacement of the seal stack 132 for a water softener using a controller 14 according to the present disclosure is much simpler, faster, and less likely to cause damage to components of the controller 14. First, the connector of the cable from the flow meter to the PCB 94 is disconnected at the flow meter (not shown) on the valve body 12. Then, the connection snaps 76 are flexed away from one another to disengage from the mounting tabs 122 of the mounting flange 28, and the controller 14 is removed from the mounting flange 28. It should be noted that the power cord to the controller 14 may need to be unplugged from the wall if the controller 14 is moved beyond the length of the power cord. At this point, the gear piston assembly 168 and the seal stack 132 are removed in a conventional manner. After the seal stack 132 is replaced and the gear piston assembly 168 is screwed onto the mounting flange 28, the controller 14 is simply pushed onto the mounting flange 28 such that the connection snaps 76 snap over the mounting tabs 122 to secure the controller 14 in place. Finally, the flow meter is reconnected.

More specifically, as the controller 14 is pushed onto the mounting flange 28, the cams 82 of the connection snaps 76 engage the front wall 118 of the mounting flange 28, causing the connection snaps 76 to flex outwardly (i.e., away from one another) from an unflexed state to a flexed state as the snaps 76 move farther over the side walls 124 of the mounting tabs 122. When the catch surfaces 83 of the connection snaps 76 reach the rear edges 126 of the mounting tabs 122, the connection snaps 76 snap back to their original unflexed state. Engagement between the catch surfaces 83 of the connection snaps 76 and the rear edges 126 of the mounting tabs 122 retains the controller 14 in place. The grooves 84 on the connection snaps 76 and the mating ridges 128 on the mounting tabs 122 provide vertical alignment guides for positioning the controller 14 when engaging it with the mounting flange 28. The flow meter is reconnected and the process is complete.

Figure 9:
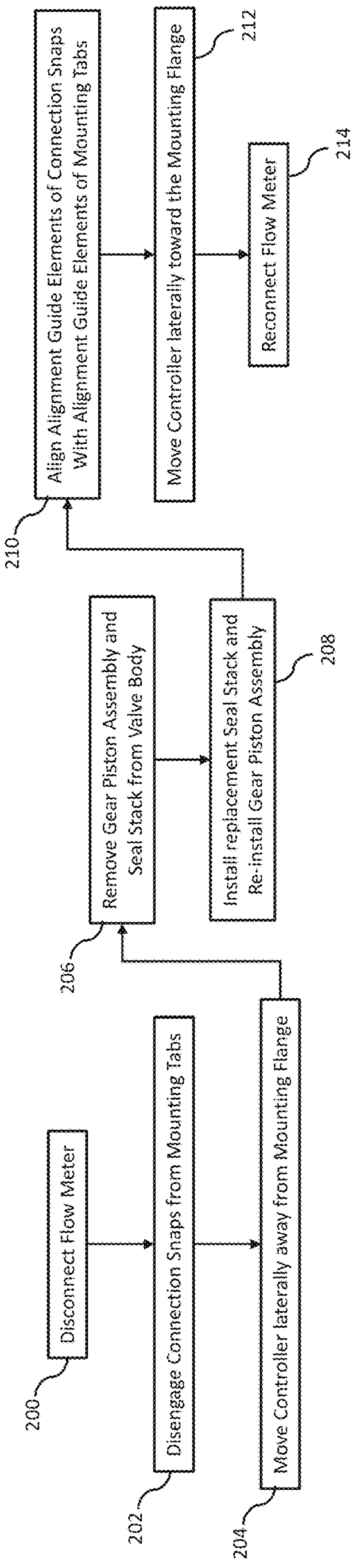
FIG. 9 is a flow chart of a method of replacing a seal stack according to one embodiment of the present disclosure.

A method of replacing a seal stack 132 of a valve body 12 according to one embodiment of the present disclosure is depicted in the flow chart of FIG. 9. As shown, at step 200 the flow meter of the valve body 12 is disconnected. At step 202, the connection snaps 76 are flexed away from one another to disengage from the mounting tabs 122 of the mounting flange 28. At step 204, the controller 14 is moved laterally away from the mounting flange 28 to disengage from the valve body 12. At step 206, the gear piston assembly 168 and the seal stack 132 are removed from the valve body 12. At step 208, a replacement seal stack 132 is installed in the valve body 12 and the gear piston assembly 168 is re-installed into the valve body 12. At step 210, the controller 14 is positioned onto the mounting flange 28 by aligning the alignment guide elements of the connection snaps 76 (i.e., the grooves 84) with the alignment guide elements of the mounting tabs 122 (i.e., the ridges 128). At step 212, the controller 14 is moved laterally toward the mounting flange 28 causing the connection snaps 76 to flex away from one another to a flexed state until the catch surfaces 83 of the connection snaps 76 pass the rear edges 126 of the mounting tabs 122, when the connection snaps 76 return to the unflexed state and retain the controller 14 on the mounting flange 28. At step 214, the flow meter is reconnected and the process is complete.

It should be noted that the controller 14 may be replaced following the steps described herein, while omitting the steps 206, 208 relating to removal and replacement of the seal stack 132. In other words, the flow meter is disconnected (step 200), the connection snaps 76 of the controller 14 are disengaged from the mounting tabs 122 (step 202), the controller 14 is moved laterally away from the mounting flange 28 (step 204), and the controller 14 is replaced with a replacement controller 14. Of course, the power cord to the controller 14 needs to be unplugged from the power connector 100 by removing the front housing 30. Then, the connection snaps 76 of the replacement controller 14 are aligned with the mounting tabs 122 (step 210), the controller 14 is moved laterally toward the mounting flange 28 to connect the controller 14 to the mounting flange 28, and the flow meter and power cord are reconnected. This process permits replacement of the controller 14 with virtually zero risk of damage to the valve body 12.

Figure 10C:
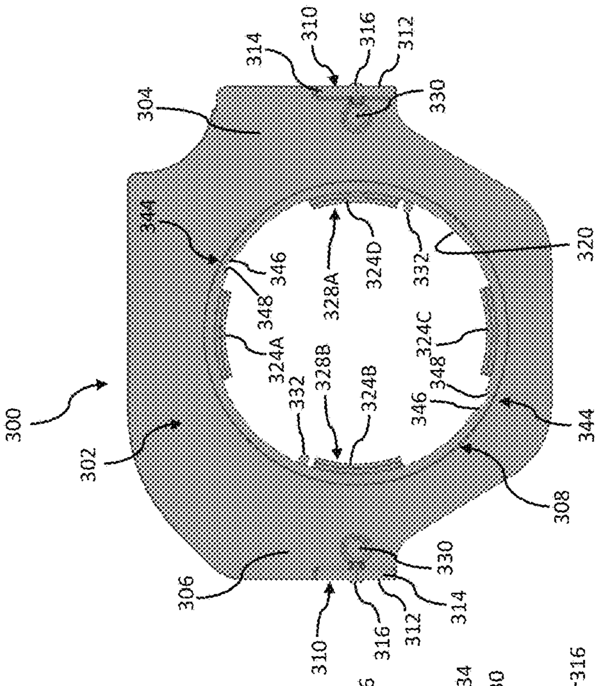
FIG. 10C is a rear view of the adapter plate of FIG. 10C.
Figure 10B:
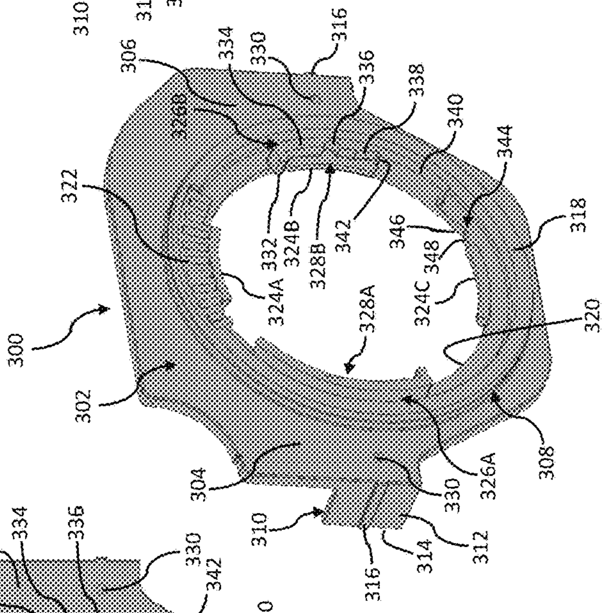
FIG. 10B is a perspective view of the adapter plate of FIG. 10A.
Figure 10A:
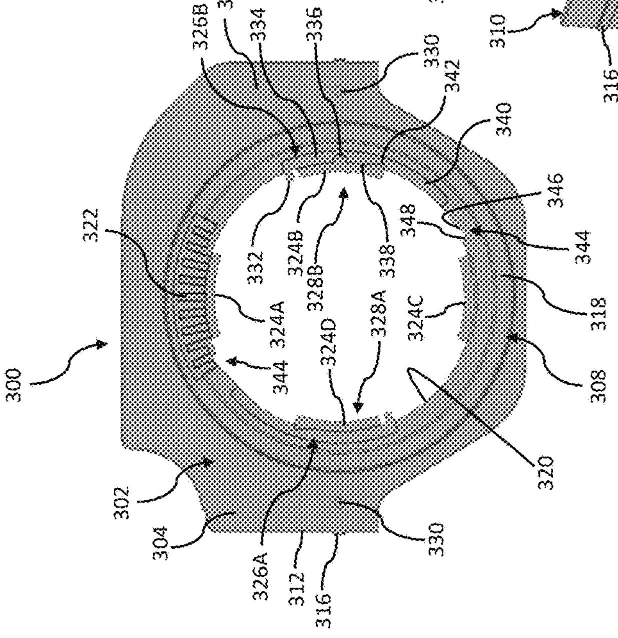
FIG. 10A is a front view of an adapter plate according to one embodiment of the present disclosure.

Referring now to FIGS. 10A-C, another embodiment of a mounting flange is shown. This embodiment of a mounting flange is referred to hereinafter as an adapter plate 300. FIG. 10A provides a front view of the adapter plate 300. FIG. 10B provides a perspective front view of the adapter plate 300. FIG. 10C provides a rear view of the adapter plate 300. The adapter plate 300 is configured for use with a valve body 12A that, unlike the valve body 12 shown in FIG. 7, does not have a mounting flange 28 molded as part of the valve body 12. As described below, the adapter plate 300 facilitates attachment of the controller 14 described above with such an alternative valve body 12A.

The adapter plate 300 generally includes a substantially planar body 302 with a pair of side extensions 304, 306 and a substantially circular mounting assembly 308. As best shown in FIGS. 10B and 10C, a mounting tab 310 extends rearwardly from each side extension 304, 306. The mounting tabs 310 each include a side wall 312 extending from the side extension 304, 306 and terminating at a rear edge 314.

A ridge 316 extends radially outwardly along a central portion of each of the side walls 312 from the side extension 304, 306 to the rear edge 314.

The mounting assembly 308 generally includes a circular outer wall 318 that extends axially forward from the planar body 302 and generally defines a central opening 320. A plurality of rotation notches 322 are formed into the outer wall 318 along an upper arcuate segment of the outer wall 318. A plurality of retainer lugs 324A-D of the mounting assembly 308 extend radially into the central opening 320. In the example shown, four retainer lugs 324A-D are provided, spaced 90 degrees from one another about the circumference of the central opening 320. In other embodiments, more or fewer retainer lugs 324A-D may be used and may be positioned with other spacings about the circumference of the central opening 320. The mounting assembly 308 also includes a pair of retainers 326A-B. In the example shown (and as is further described below), the retainer 326A extends radially inwardly from the outer wall 318 at a position relative to the retainer lug 324D to form a retention slot 328A with the retainer lug 324D. Similarly, the retainer 326B extends radially inwardly from the outer wall 318 at a position relative to the retainer lug 324B to form a retention slot 328B with the retainer lug 324B. In certain embodiments, the side extensions 304, 306 of the body 302 of the adapter plate 300 each include a blind bore 330 that may be used to secure the rear housing 32 of the controller 14 to the adapter plate 300 as is further described below.

Referring still to FIGS. 10A-C, the retainers 326A, 326B will be described in greater detail. As the retainers 326A, 326B include the same features, only one retainer 326B is described in detail below. The retainer 326B includes a stop 332 at one end which extends radially inwardly partially into the central opening 320. A retention wall 334 of the retainer 326B extends from the stop 332 along the outer wall 318 partially into the central opening 320 in the area of the retainer lug 324B. The retention wall 334 includes a cutout 336 near its mid-section and a bevel 338 which bevels radially inwardly toward the outer wall 318. The bevel 338 of the retention wall 334 transitions into a compression wall 340 of the retainer 326B at an outward step 342.

The mounting assembly 308 of the adapter plate 300 also includes a pair of clearance notches 344 formed along the perimeter of the central opening 320 between the retainer lug 324A and the retention slot 328A and between the retainer lug 324C and the retention slot 328B. Each clearance notch 344 includes an angled surface 346 that extends outwardly from the perimeter of the central opening 320 and a return surface 348 that extends back to the perimeter of the central opening 320. The clearance notches 344 provide clearance for the adapter plate 300 to be placed onto the valve body 12A as is further described below.

Figure 11:
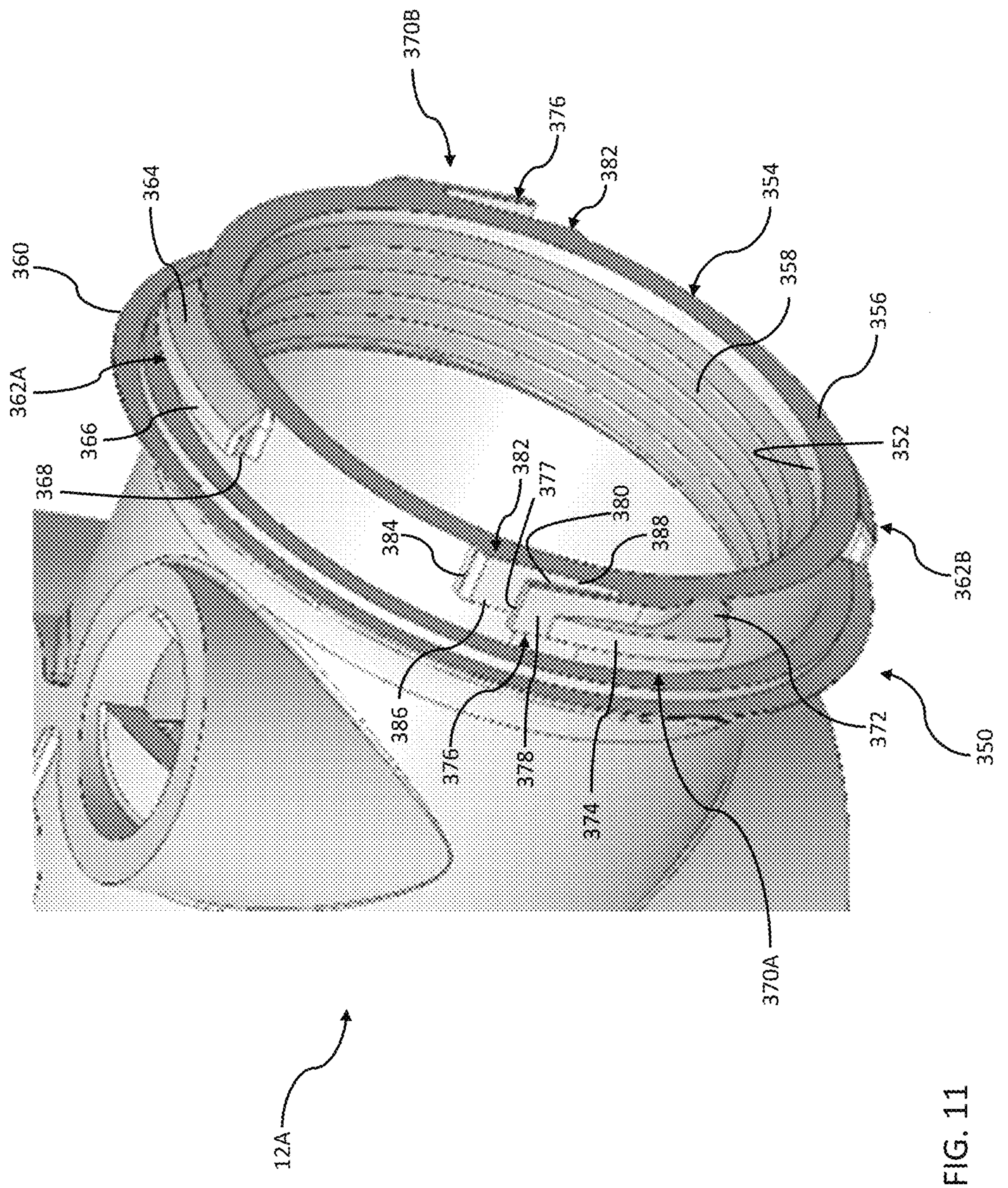
FIG. 11 is a perspective view of a retention stop of an alternative valve body.

Referring now to FIG. 11, a portion of a valve body 12A for use with the adapter plate 300 is shown. The valve body 12A includes a retention stop 350 that defines a central opening 352 for receiving a seal stack 132 and a gear piston assembly 168 as described above. The retention stop 350 includes a cylindrical wall 354 having an outer edge 356, inner threads 358 and a circumferential ridge 360 that is spaced apart from the outer edge 356 and extends radially outwardly from the cylindrical wall 354. A pair of valve lugs 362A, 352B extend radially outwardly from the cylindrical wall 354. In the example shown, the valve lugs 362A, 362B are spaced apart from one another by 180 degrees. As the valve lugs 362A, 362B are identical, only one valve lug 362A is described below. The valve lug 362A includes a forward beveled surface 364, an outer surface 366 and a rearward surface 368. The forward beveled surface 364 tapers radially outwardly from the outer edge 356 of the cylindrical wall 354 to the outer surface 366 of the valve lug 362A. The rearward surface 368 extends radially from the outer surface 366 to the cylindrical wall 354.

A pair of snaps 370A, 370B also extend radially outwardly from the cylindrical wall 354. The snaps 370A, 370B are spaced apart from one another by 180 degrees and spaced apart from the valve lugs 362A, 362B by 90 degrees such that the snap 370A is positioned between the valve lugs 362A, 362B at a "9:00" position and the snap 370B is positioned between the valve lugs 362A, 362B at a "3:00" position. As the snaps 370A, 370B are identical, only one snap 370A is described below.

Snap 370A includes an attachment segment 372 that extends from the cylindrical wall 354 of the retention stop 350 and has a support arm 374 that extends away from the attachment segment 372. The support arm 374 extends partially along the cylindrical wall 354 and partially radially outward from the cylindrical wall 354. The support arm 374 is connected to or integral with a tang 376 which also extends partially along the cylindrical wall 354 and partially radially outward from the cylindrical wall 354. The tang 376 includes an outer surface 378 connected to or integral with the support arm 374 and an inner surface 380. The tang 376 also includes a distal or free end 377. A pair of engagement walls 382 is also formed on the cylindrical wall 354 adjacent each of the snaps 370A, 370B. Each engagement wall 382 includes an end portion 384 that extends radially outward from the cylindrical wall 354 and an outer surface 386 that tapers from the end portion 384 radially inwardly into the cylindrical wall 354 to form a substantially triangular gap 388 with the inner surface 380 of the tang 376.

Figure 12:
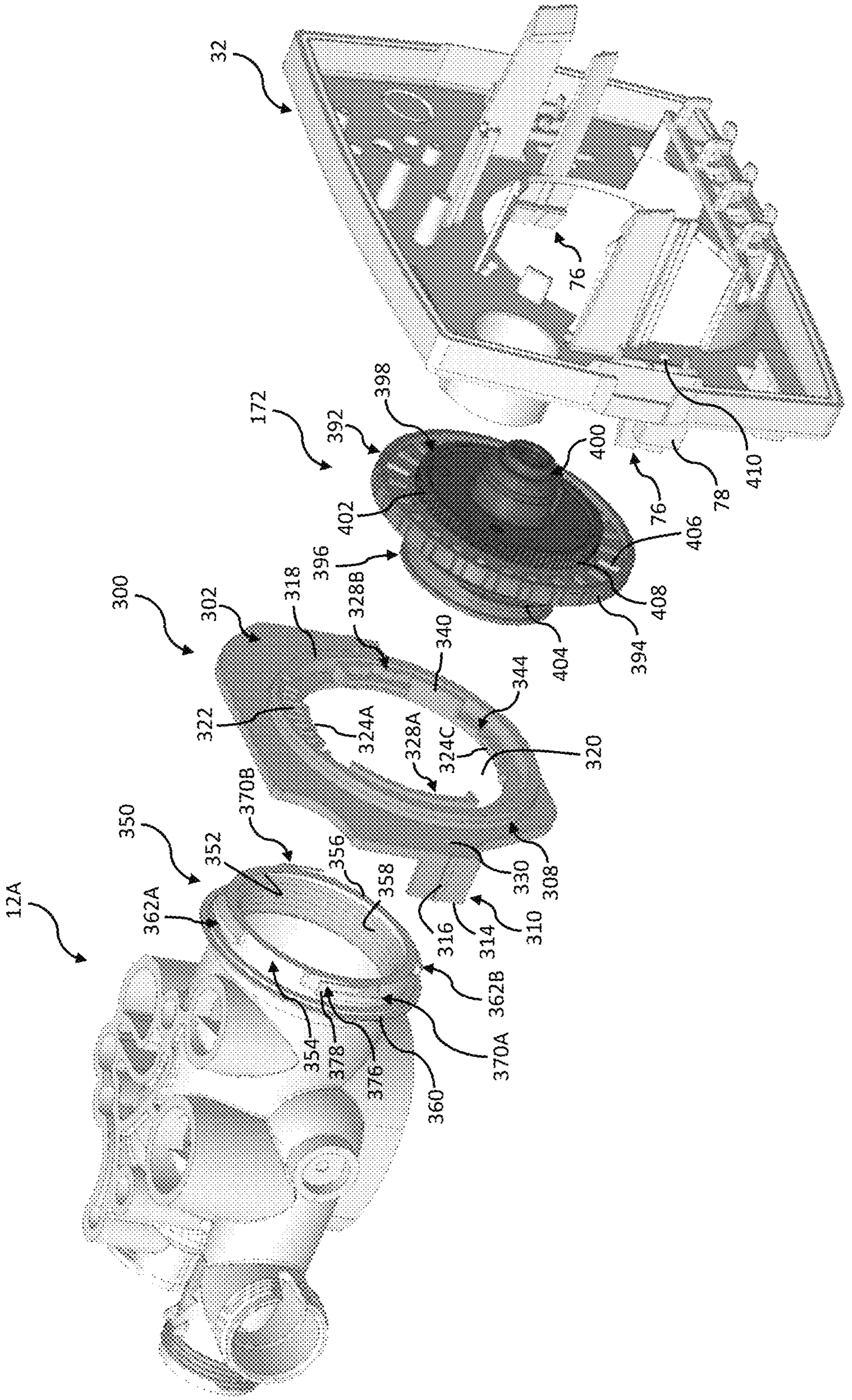
FIG. 12 is a perspective exploded view of the valve body of FIG. 11, the adapter plate of FIGS. 10A-C, a drive gear and a portion of a controller housing.

Referring now to FIG. 12, the valve body 12A, the adapter plate 300, a drive gear 172 (shown without the piston 170 attached), and the rear housing 32 of the controller 14 are shown. Generally, the adapter plate 300 is connected to the valve body 12A and a seal stack 132 (FIG. 7) and the drive gear 172 and the piston 170 (FIG. 7) are installed in or removed from the valve body 12A in the manner described above with reference to the valve body 12. The controller 14 may be attached to or detached from the adapter plate 300 in a manner similar to that described above with reference to FIG. 7 as is further described below.

The drive gear 172 includes a central body 392 with an outer ring 394 and a piston mating portion 396. A piston driver 398 is coupled to the central body 392 and includes an internally threaded driving boss 400 and a gear 402. The piston mating portion 396 include a plurality of outer threads 404. The outer ring 394 includes a plurality of radially extending slots 406 spaced apart adjacent the perimeter of the outer ring 394. The gear 402 include a plurality of teeth 408 on its outer perimeter.

Figure 13:
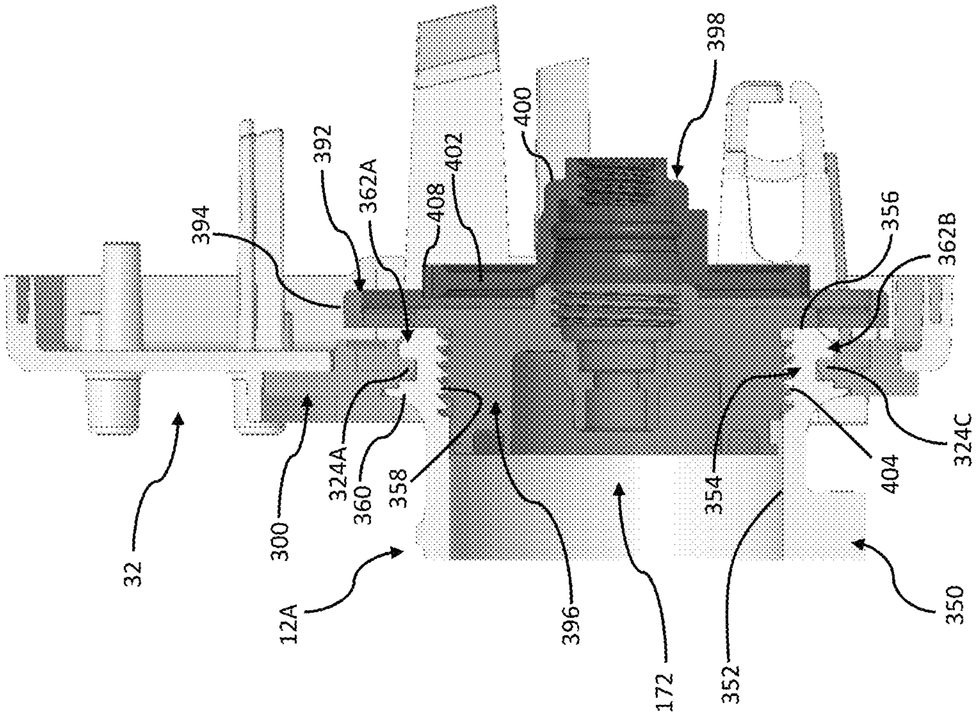
FIG. 13 is a side cross-sectional view of the components of FIG. 12 assembled together.

Referring now primarily to FIGS. 11-13, the adapter plate 300 is installed onto the retention stop 350 of the valve body 12A by aligning the clearance notches 344 with the tangs 376 of the snaps 370A, 370B and moving the adapter plate 300 axially toward the circumferential ridge 360 of the retention stop 350 into an engaged position. As the adapter plate 300 is moved toward the engaged position, the angled surface 346 and the return surface 348 of the clearance notches 344 pass over the tangs 376, the retainer lug 324A of the adapter plate 300 passes between the snap 370A and the valve lug 362A, the retainer lug 324C of the adapter plate 300 passes between the snap 370B and the valve lug 362B, the retention slot 328A of the adapter plate 300 passes between the snap 370A and the valve lug 362B, and the retention slot 328B of the adapter plate 300 passes between the snap 370B and the valve lug 362A.

After the adapter plate 300 is moved axially onto the cylindrical wall 354 of the retention stop 350 into the engaged position, the adapter plate 300 is rotated clockwise back to the orientation shown in FIG. 12 until the adapter plate 300 reaches a seated position on the cylindrical wall 354. During this rotation, the retainer lug 324A moves between the circumferential ridge 360 and the valve lug 362A and the retainer lug 324C moves between the circumferential ridge 360 and the valve lug 362B. The position of the retainer lugs 324B, 324B behind the rearward surfaces 348 of the valve lugs 362A, 362B, respectively, is part of the structure for retaining the adapter plate 300 on the retention stop 350. The rotation of the adapter plate 300 also causes the snaps 370A, 370B of the retention stop 350 to engage and lock into the retention slots 328A, 328B, respectively, of the adapter plate 300. As the engagement between the snap 370A and the retention slot 328A is substantially the same as the engagement between the snap 370B and the retention slot 328B, only the engagement between the snap 370A and the retention slot 328A is described below.

When the installer begins the clockwise rotation of the adapter plate 300 relative to the retention stop 350, the support arm 374 of the attachment segment 372 of the snap 370A engages the compression wall 340 of the retention slot 328A. Further rotation of the adapter plate 300 causes the support arm 374 to move onto the compression wall 340 which causes the support arm 374 and the tang 376 to flex radially inwardly toward the outer surface 386 of the engagement wall 382, thereby reducing size of the gap 388. Upon further clockwise rotation of the adapter plate 300, the outer surface 378 of the tang 376 passes over the outward step 342 of the retainer 326A of the retention slot 328A until the free end 377 rotates past the outward step 342. When the free end 377 of the tang 376 rotates past the outward step of the retainer 326A, the support arm 374 and the tang 376 of the snap 370A are free to unflex and substantially return to their normal state. In doing so, the support arm 374 and the tang 376 move into engagement with the bevel 338 of the retainer 326A of the retention slot 328A. The snap 370A is now seated within the retention slot 328A. When the adapter plate 300 is in this seated position, further clockwise rotation of the adapter plate 300 is prevented by engagement between the attachment segment 372 of the snap 370A and the stop 332 of the retainer 326A. Additionally, rotation of the adapter plate 300 in the counter-clockwise direction is inhibited by engagement between the free end 377 of the tang 376 and the outward step 342 of the retainer 326A.

When the snaps 370A, 370B of the retention stop 350 are fully seated in the retention slots 328A, 328B, respectively, of the adapter plate 300 as described above, it is possible to remove the adapter plate 300 by inserting a tool such as a fine flat blade screwdriver in between both of the bevels 338 of the retainers 326A, 326B and the outer surfaces 378 of the tangs 376 to deflect or flex the tangs 376 radially inwardly until the free ends 377 of the tangs 376 can clear the outward steps 342 of the retention walls 334 of the retainers 326A, 326B. The cutouts 336 may be used for the same purpose. After the tangs 376 are flexed in this manner, the adapter plate 300 may be rotated in the counter-clockwise direction until the tangs 376 are aligned with the clearance notches 344 of the adapter plate 300 thereby permitting the adapter plate 300 to be moved axially away from the circumferential ridge 360 of the cylindrical wall 354 and removed from the retention stop 350.

After the adapter plate 300 is installed onto the retention stop 350 in the manner described above, the seal stack 132 and the gear piston assembly 168 may be installed in the valve body 12A in the manner described above with reference to FIGS. 7-9. As part of this installation process, the piston mating portion 396 of the drive gear 172 is passed through the central opening 320 of the adapter plate 300 and the outer threads 404 of the piston mating portion 396 are threaded into the inner threads 358 of the cylindrical wall 354 of the retention stop 350 of the valve body 12A until the drive gear 172 is seated in the retention stop 350. It should be noted that the drive gear 172 may be unthreaded from the retention stop 350 by passing a tool such as a flat blade screwdriver through the radially extending slots 406 of the outer ring 394 of the central body 392 of the drive gear 172 and into one of the plurality of rotation notches 322 formed in the circular outer wall 318 of the mounting assembly 308 of the adapter plate 300, then moving the tool to the left to cause counter-clockwise rotation of the drive gear 172. This rotation begins the unthreading of the drive gear 172 from the retention stop 350.

After the seal stack 132 and the gear piston assembly 168 are installed in the valve body 12A, the controller 14 may be reattached to the adapter plate 300 in a manner similar to that described above. A more detailed description of the reattachment of the controller 14 is describe below with reference to FIGS. 12 and 13, noting that only the rear housing 32 of the controller 14 is shown.

Referring to FIGS. 4, 5A, 5B and 12, the controller 14 is attached to the adapter plate 300 by aligning the grooves 84 of the connection snaps 76 with the ridges 316 of the mounting tabs 310 and moving the controller 14 axially toward the adapter plate 300. The cams 82 of the connection snaps 76 engage the body 302 of the adapter plate 300, causing the connection snaps 76 to flex outwardly (i.e., away from one another) from an unflexed state to a flexed state as the snaps 76 move farther over the mounting tabs 310. When the catch surfaces 83 of the connection snaps 76 reach the rear edges 314 of the mounting tabs 310, the connection snaps 76 snap back to their original unflexed state. Engagement between the catch surfaces 83 of the connection snaps 76 and the rear edges 314 of the mounting tabs 310 retains the controller 14 in place. The controller 14 may be detached from the adapter plate 300 by flexing the connection snaps 76 away from each other and moving the controller 14 axially away from the adapter plate 300.

In some installations, it may be desirable to provide an additional mechanism for securing the controller 14 to the adapter plate 300. In such installations, after the controller 14 is attached to the adapter plate 300 as described above, fasteners such as self-threading screws (not shown) may be passed through openings 410 (FIG. 12) formed in the rear housing 32 of the controller 14 and threaded into the blind bores 330 of the body 302 of the adapter plate 300.

Any directional references used with respect to any of the figures, such as right or left, up or down, or top or bottom, are intended for convenience of description, and do not limit the present disclosure or any of its components to any particular positional or spatial orientation. Additionally, any reference to rotation in a clockwise direction or a counter-clockwise direction is simply illustrative. Any such rotation may be implemented in the reverse direction as that described herein.

Although the foregoing text sets forth a detailed description of embodiments of the disclosure, it should be understood that the legal scope of the invention is defined by the words of the claims set forth at the end of this patent and equivalents. The detailed description is to be construed as exemplary only and does not describe every possible embodiment. Numerous alternative embodiments may be implemented, using either current technology or technology developed after the filing date of this patent, which would still fall within the scope of the claims.

The following additional considerations apply to the foregoing description. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at various times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single device or geographic location (e.g., within a home environment, an office environment, or a server farm). In other example embodiments, the one or more processors or processor-implemented modules may be distributed across a number of devices or geographic locations.

Unless specifically stated otherwise, use herein of words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Additionally, some embodiments may be described using the expression "communicatively coupled," which may mean (a) integrated into a single housing, (b) coupled using wires, or (c) coupled wirelessly (i.e., passing data/commands back and forth wirelessly) in various embodiments.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. An adapter plate for coupling a water treatment system controller to a valve body having a retention stop with a cylindrical wall and valve lugs and snaps extending radially outward from the cylindrical wall, the adapter plate comprising:

a plurality of mounting tabs;

an outer wall defining a central opening;

a plurality of retainer lugs extending radially inward from the outer wall;

a plurality of retention slots extending radially inward from the outer wall; and a plurality of clearance notches extending radially outward into the outer wall and spaced to align with the snaps of the retention stop;

wherein when the plurality of clearance notches is aligned with the snaps, each of the plurality of retainer lugs is positioned between a valve lug and a snap permitting the plurality of clearance notches to pass over the snaps and the plurality of retainer lugs to pass between the valve lugs and the snaps as the adapter plate is moved axially onto the cylindrical wall of the retention stop into an engaged position;

wherein the plurality of retention slots is configured to flex the snaps radially inward as the adapter plate is rotated in a first direction from the engaged position to a seated position in which the snaps seat within the plurality of retention slots; and wherein the plurality of mounting tabs is configured to mate with connection snaps on the controller to couple the controller to the valve body.

2. The adapter plate of claim 1, wherein each of the plurality of mounting tabs extends rearwardly from a body of the adapter plate and includes a side wall with a rear edge and a ridge extending from the body to the rear edge.

3. The adapter plate of claim 2, wherein each of the connection snaps of the controller includes an alignment guide element that receives a ridge of one of the plurality of mounting tabs and a catch surface that engages a rear edge of the one mounting tab to secure the controller to the adapter plate.

4. The adapter plate of claim 3, wherein the plurality of mounting tabs is configured to cause the connection snaps to flex away from one another until the catch surfaces of the connection snaps engage the rear edges of the plurality of mounting tabs.

5. The adapter plate of claim 1, wherein when the adapter plate is in the seated position, a pair of the plurality of retainer lugs is positioned behind a pair of valve lugs, thereby preventing axial movement of the adapter plate away from a circumferential ridge of the cylindrical wall of the retention stop.

6. The adapter plate of claim 1, wherein each of the plurality of retention slots includes one of the plurality of retainer lugs and a retainer that extends along the outer wall.

7. The adapter plate of claim 6, wherein each retainer includes a compression wall that engages a snap to cause the snap to flex radially inward as the adapter plate is rotated from the engaged position to the seated position.

8. The adapter plate of claim 7, wherein each retainer includes a retention wall having a bevel to receive a snap when the snap unflexes as the adapter plate reaches the seated position and an outward step to retain the snap and inhibit rotation of the adapter plate in a second direction that is opposite the first direction.

9. The adapter plate of claim 6, wherein each retainer includes a stop that extends radially inward from the outer wall and limits rotation of the adapter plate in the first direction by engaging a snap as the adapter plate reaches the seated position.

10. The adapter plate of claim 1, wherein each of the plurality of clearance notches includes an angled surface and a return surface that are together configured to receive a tang of a snap when the plurality of clearance notches is aligned with the snaps.

11. The adapter plate of claim 1, wherein the outer wall includes a plurality of rotation notches configured to receive a tool used to rotate a drive gear installed in the valve body.

12. A system for mounting a water treatment system controller to a valve body having a retention stop with a cylindrical wall and valve lugs and snaps extending radially outward from the cylindrical wall, the system comprising:

an adapter plate having mounting tabs, clearance notches, retainer lugs and retention slots positioned around a central opening of the adapter plate such that when the clearance notches are aligned with the snaps, the retainer lugs and the retention slots are positioned between the valve lugs and the snaps such that the adapter plate may be moved axially onto the cylindrical wall into an engaged position and rotated in a first direction from the engaged position to a seated position wherein the retainer lugs are positioned behind the valve lugs and the snaps are seated within the retention slots; and a controller housing including connection snaps that engage the mounting tabs to secure the controller to the adapter plate.

13. The system of claim 12, wherein each of the mounting tabs extends rearwardly from a body of the adapter plate and includes a side wall with a rear edge and a ridge extending from the body to the rear edge.

14. The system of claim 13, wherein each of the connection snaps includes an alignment guide element that receives a ridge of one of the mounting tabs and a catch surface that engages a rear edge of the one mounting tab to secure the controller to the adapter plate.

15. The system of claim 14, wherein the mounting tabs are configured to cause the connection snaps to flex away from one another until the catch surfaces of the connection snaps engage the rear edges of the mounting tabs.

16. The system of claim 12, wherein when the adapter plate is in the seated position, a pair of the retainer lugs is positioned behind a pair of valve lugs, thereby preventing axial movement of the adapter plate away from a circumferential ridge of the cylindrical wall of the retention stop.

17. The system of claim 12, wherein each of the retention slots includes one of the retainer lugs and a retainer, each retainer including a compression wall that engages a snap to cause the snap to flex radially inward as the adapter plate is rotated from the engaged position to the seated position.

18. The system of claim 17, wherein each retainer includes a retention wall having a bevel to receive a snap when the snap unflexes as the adapter reaches the seated position and an outward step to retain the snap and inhibit rotation of the adapter plate in a second direction that is opposite the first direction.

19. The system of claim 17, wherein each retainer includes a stop that extends radially into the central opening and limits rotation of the adapter plate in the first direction by engaging a snap as the adapter plate reaches the seated position.

20. The system of claim 12, wherein each of the clearance notches includes an angled surface and a return surface that are together configured to receive a tang of a snap when the clearance notches are aligned with the snaps.

21. A method of mounting a water treatment system controller to a valve body having a retention stop with valve lugs and snaps extending radially outward from a cylindrical wall, comprising:

- aligning clearance notches of an adapter plate with the snaps;
- moving the adapter plate axially onto the cylindrical wall into an engaged position;
- rotating the adapter plate in a first direction from the engaged position to a seated position wherein retainer lugs of the adapter plate are positioned behind the valve lugs and retention slots of the adapter plate receive the snaps;
- aligning guide elements of connection snaps of the controller with ridges on mounting tabs of the adapter plate; and
- moving the controller axially toward the adapter plate until the connection snaps extend over the mounting tabs, thereby securing the controller to the adapter plate.

* * * * *